March 1, 1932.  H. S. PARDEE  1,847,260
POWER APPARATUS
Filed Aug. 6, 1927  8 Sheets-Sheet 5
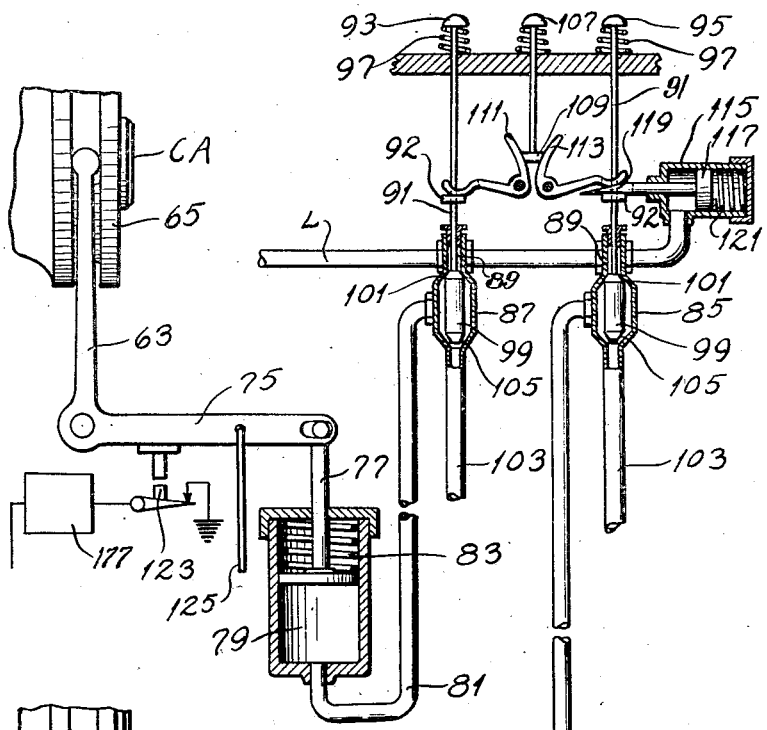
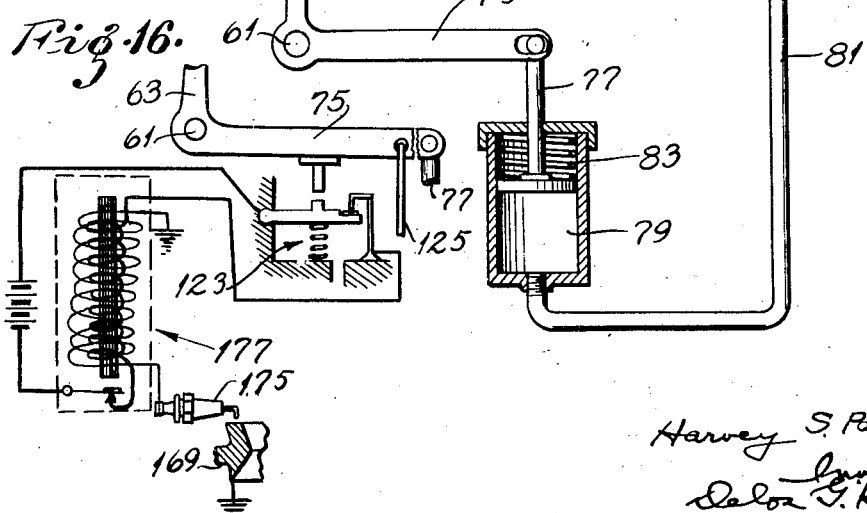

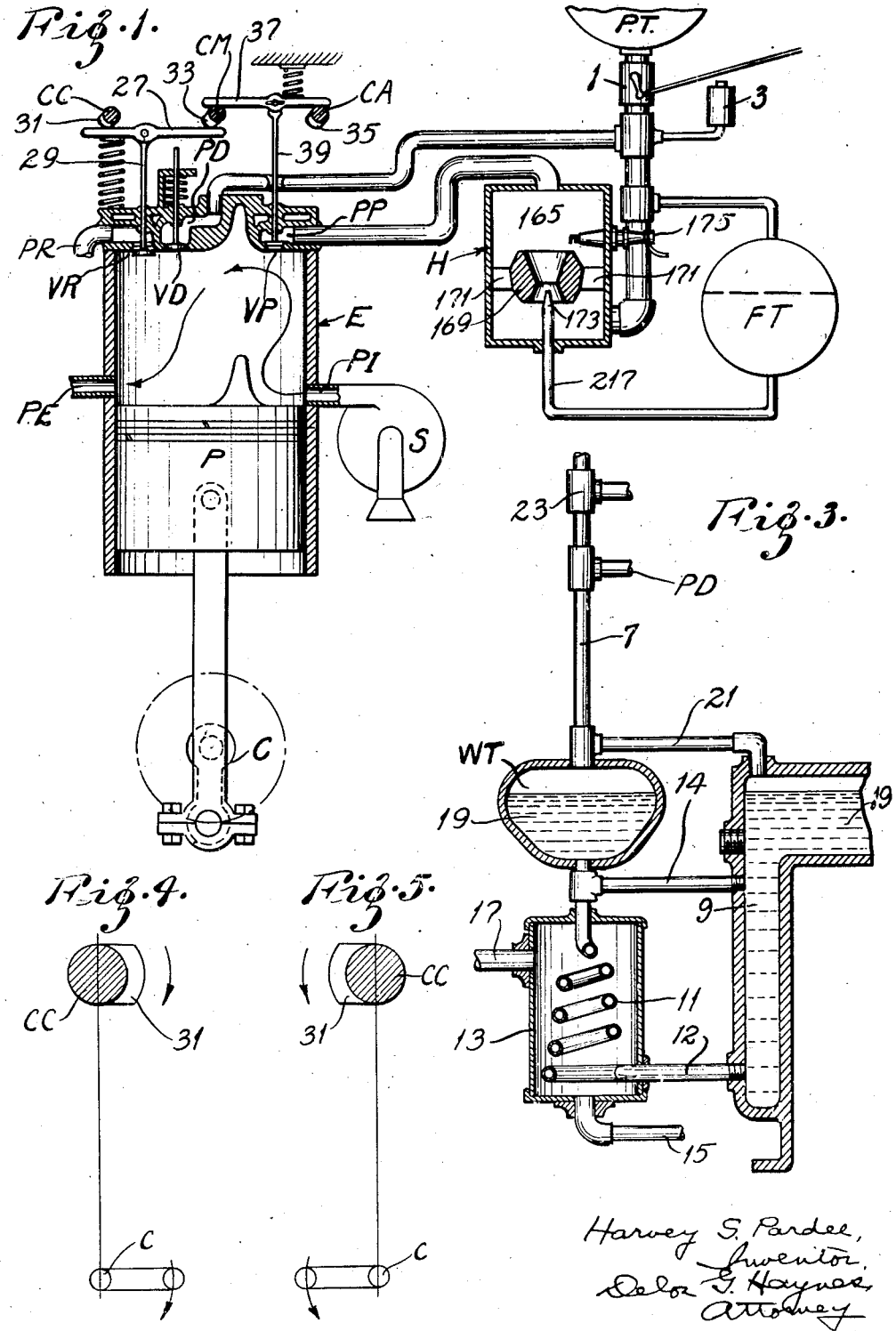

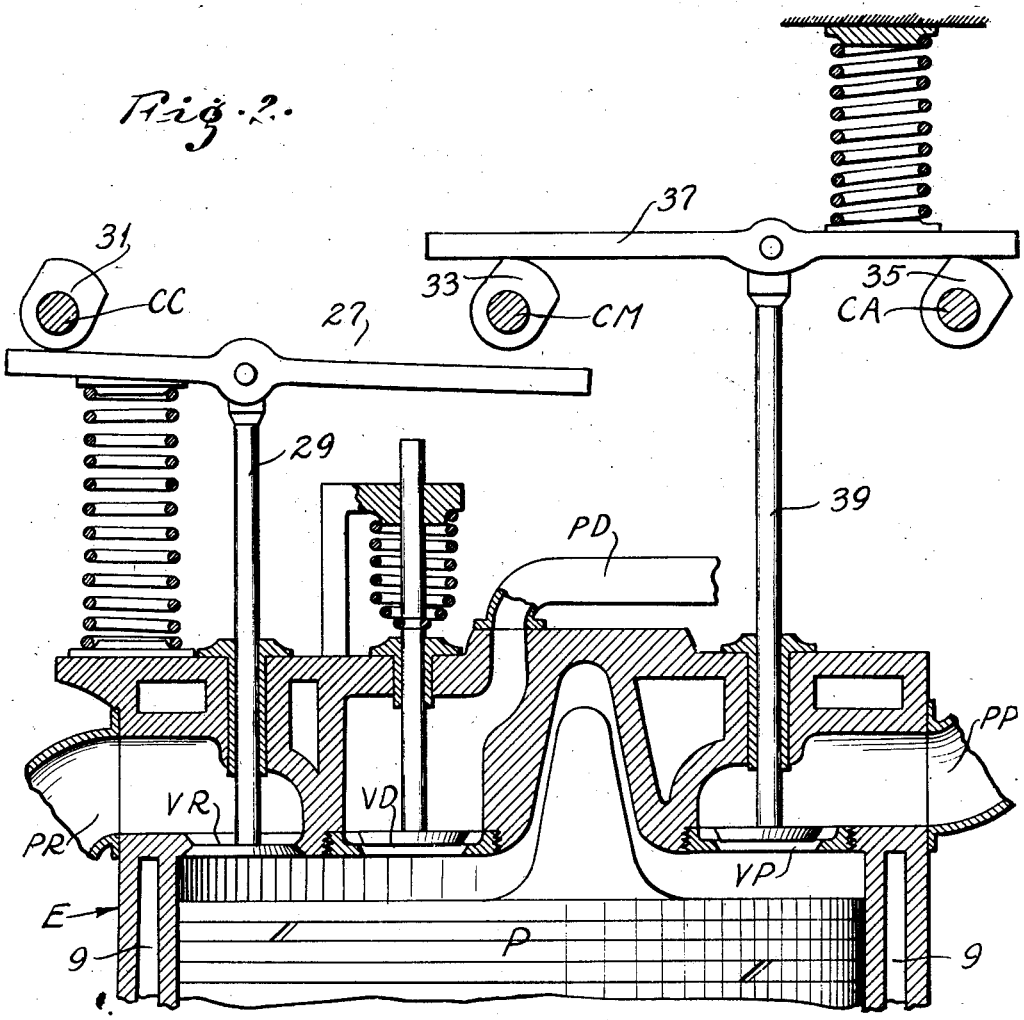

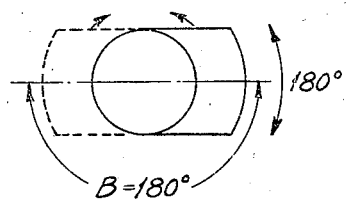
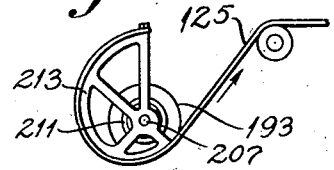
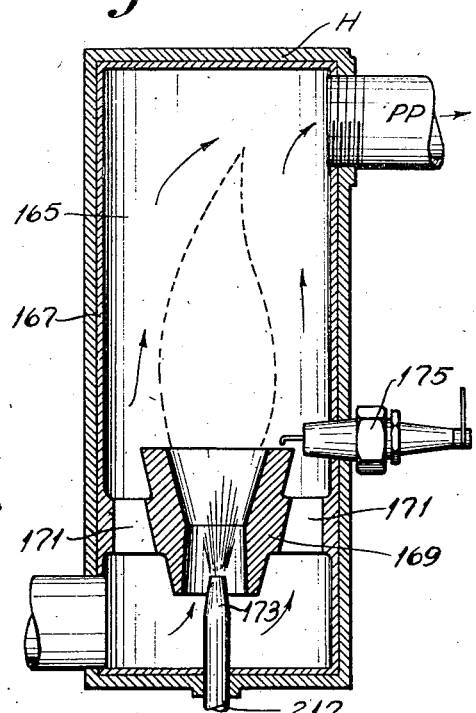
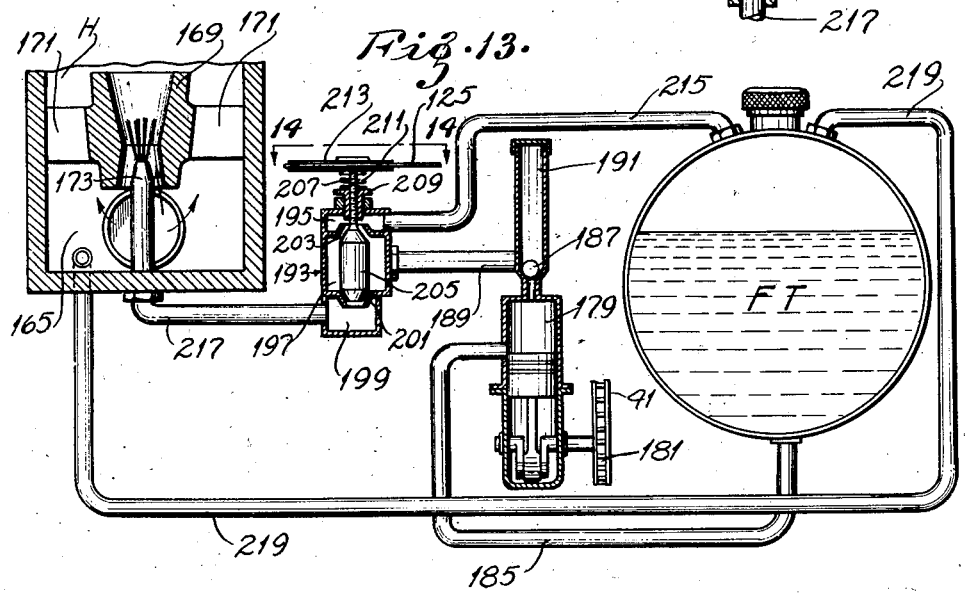

March 1, 1932. H. S. PARDEE 1,847,260
POWER APPARATUS
Filed Aug. 6, 1927   8 Sheets-Sheet 6

Harvey S. Pardee,
Inventor.
Delos G. Haynes
Attorney

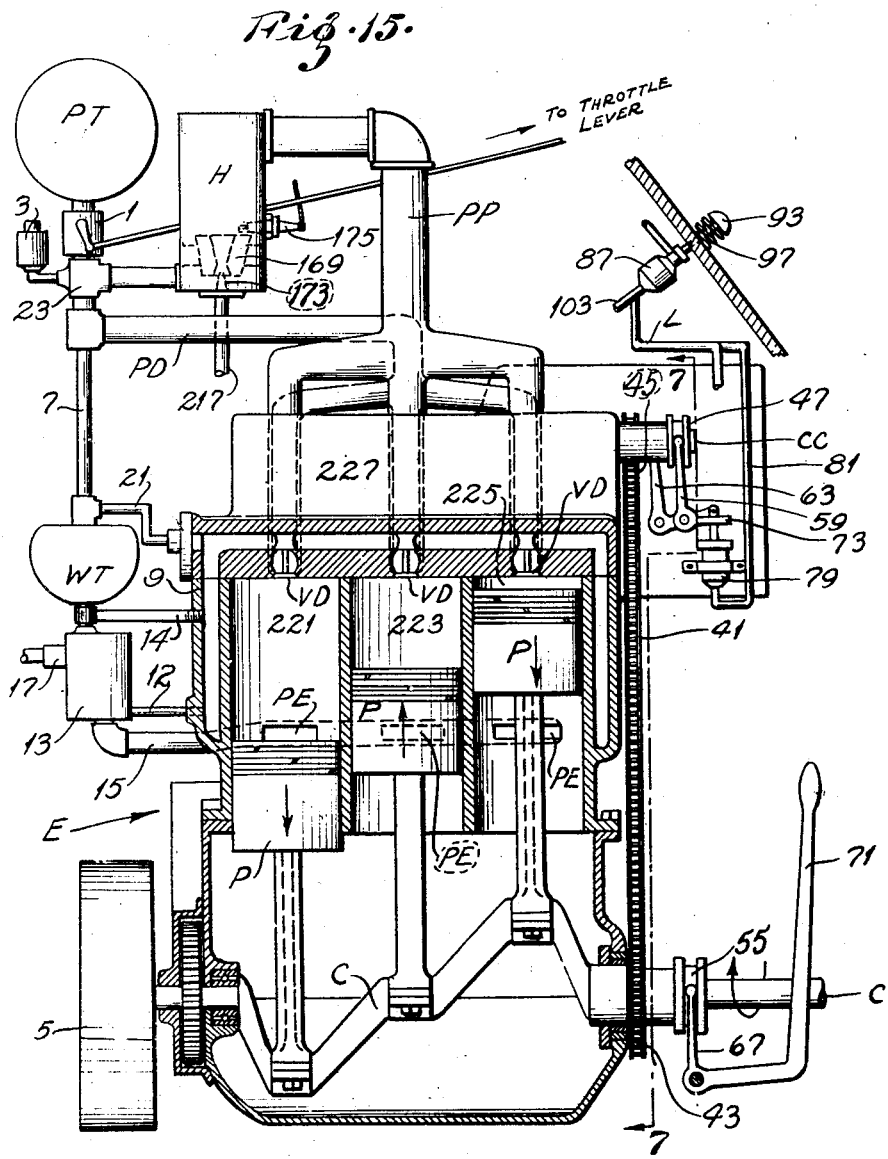

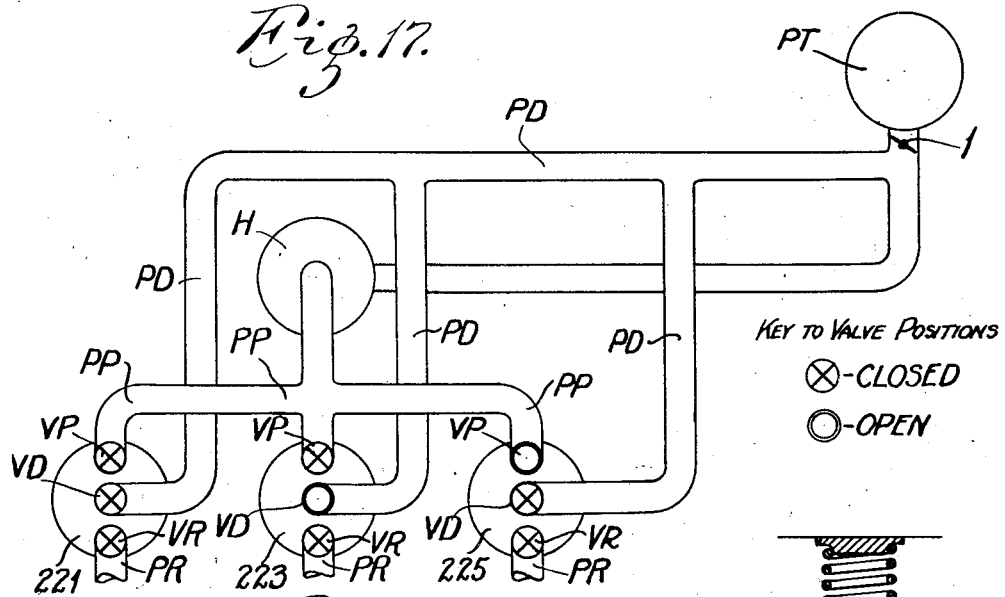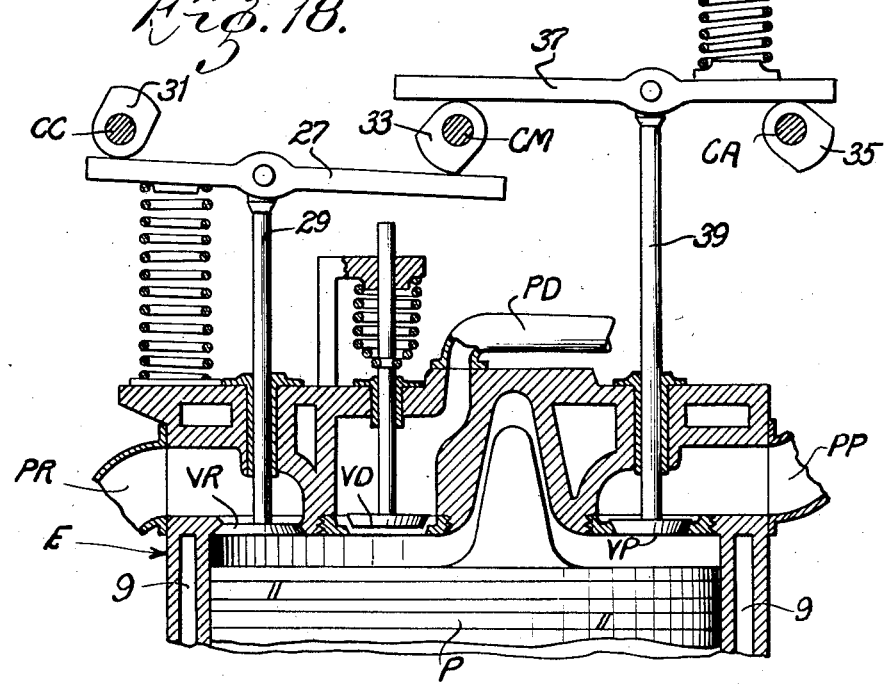

Patented Mar. 1, 1932

1,847,260

UNITED STATES PATENT OFFICE

HARVEY S. PARDEE, OF RAVINIA, ILLINOIS, ASSIGNOR TO DELOS G. HAYNES, OF ST. LOUIS, MISSOURI

POWER APPARATUS

Application filed August 6, 1927. Serial No. 211,103.

This invention relates to power apparatus and with regard to certain more specific features, to power apparatus of the expansive fluid type.

Among the several objects of the invention may be noted the provision of apparatus for converting heat energy into mechanical effort on a crank shaft; the provision of means of the class described wherein a gas is compressed in a cylinder, heated under constant pressure in a separate device, returned to the cylinder and there expanded on a succeeding working stroke and the provision of means for compressing a gas so that its stored potential energy is available for starting or assisting in driving under peak load requirements in excess of normal engine rating, the large overload capacity being independent of the rate of heat supply.

Another object is the provision in a driving engine of flexible torque control independent of the speed, whereby the engine can develop any desired torque, from zero to the maximum torque of which it is capable, either while at a standstill or running at any speed in either direction, so that it may be connected directly to the load without the necessity of interposing clutches and change gearing to alter the relation between engine speed and load speed.

Another object is to provide means whereby the engine torque can be made either positive or negative so that it will either aid rotation and deliver power, or oppose rotation and absorb power and store energy from an external source, thus functioning as a regenerative brake when used to absorb kinetic energy from a vehicle or the like.

Another object is the provision of a device which functions on a highly efficient thermodynamic cycle, whereby fuel economy is improved.

Other objects will be in part obvious and in part pointed out hereinafter.

The invention accordingly comprises the elements and combination of elements, features of construction, and arrangements of parts which will be exemplified in the structure hereinafter described, and the scope of the application of which will be indicated in the following claims.

In the accompanying drawings, in which are illustrated several possible embodiments of the invention, Fig. 1 is a diagrammatic view illustrating broadly the cycle of operations;

Fig. 2 is an enlarged section showing the controlling valve gear;

Fig. 3 is a fragmentary view showing the application of means for absorbing exhaust heat and jacket losses;

Figure 8:
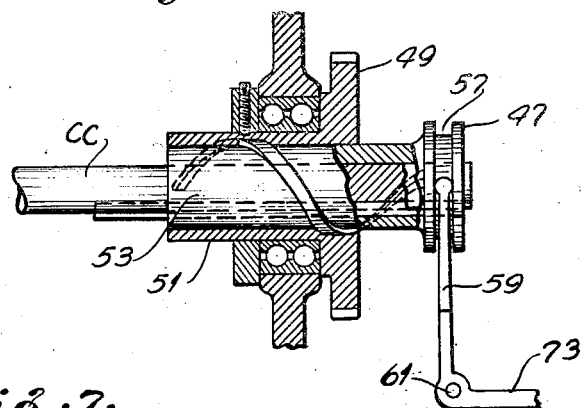
Figure 7:
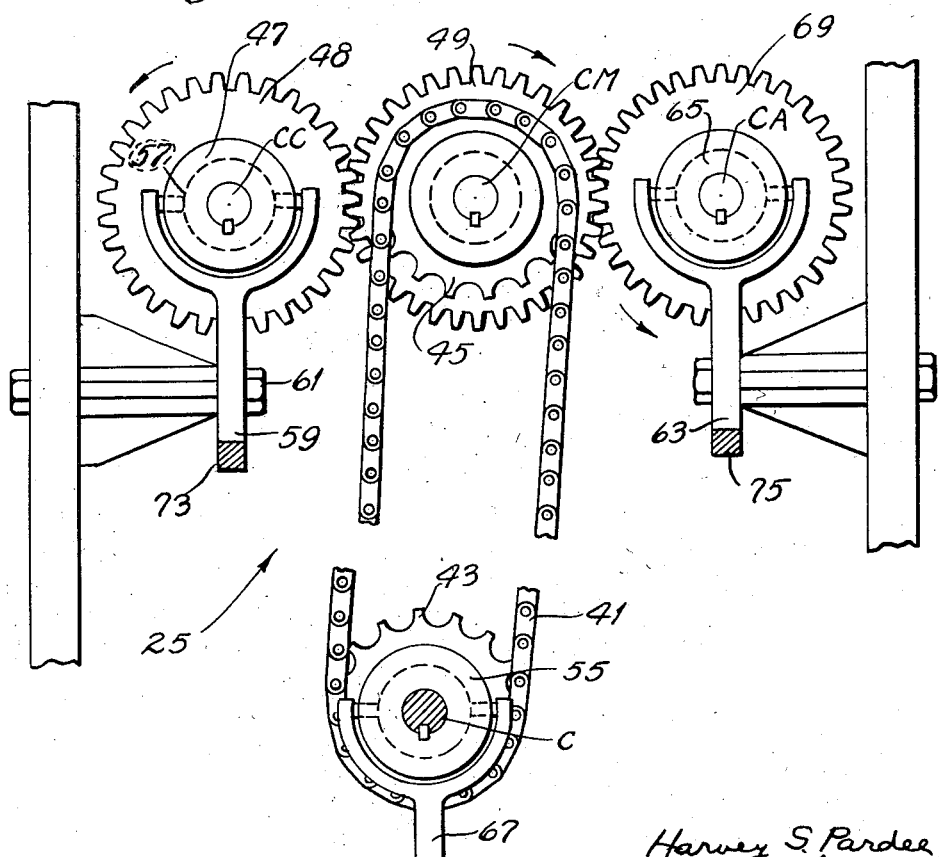
Figure 11:
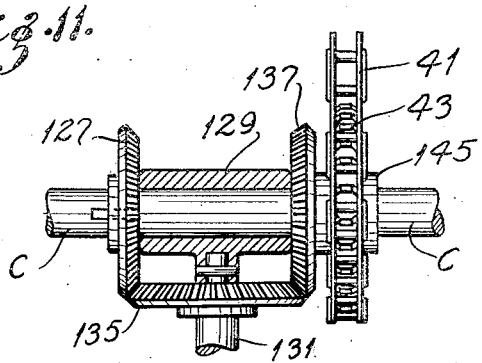
Figure 10:
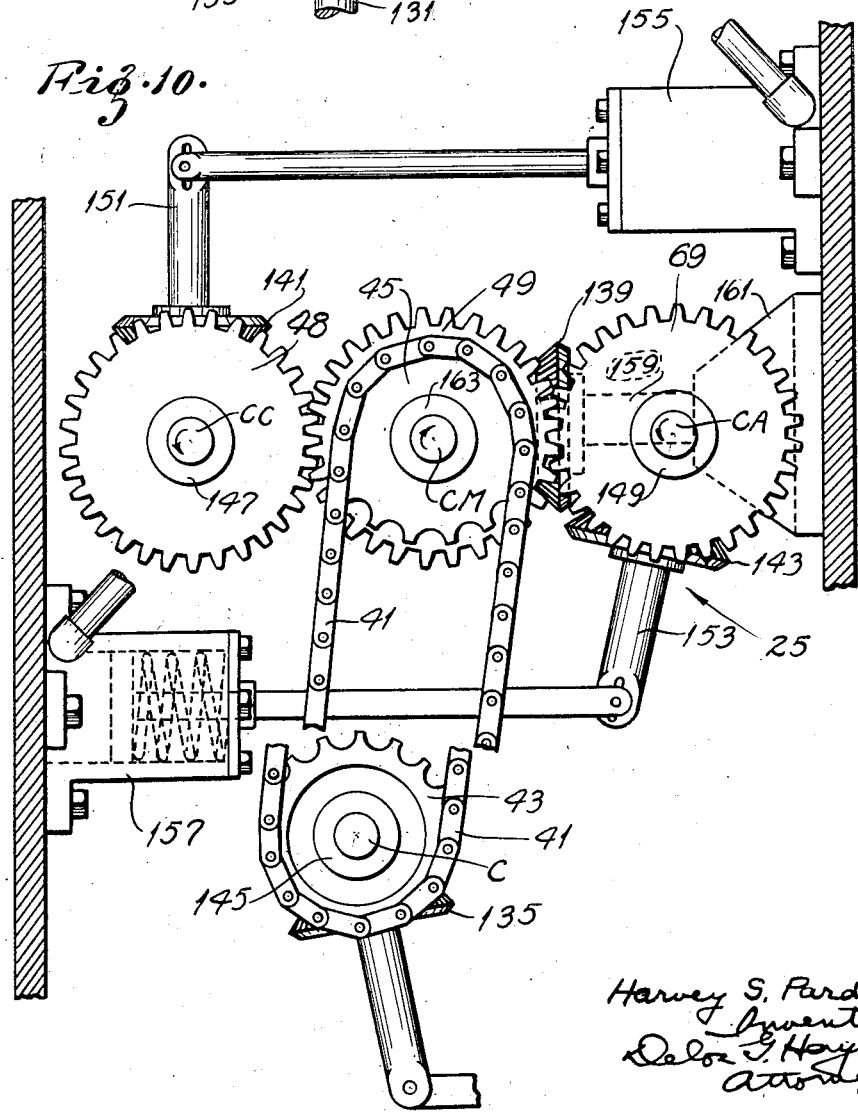

Figs. 4 and 5 diagrammatically illustrate the results of certain reversing operations;

Fig. 6 is a view showing the effect of reversing a cam operation;

Fig. 7 is a vertical transverse section taken approximately on line 7—7 of Fig. 15;

Fig. 8 is a vertical longitudinal section of a device for regulating the timing of the valve gear;

Fig. 9 is a diagrammatic view showing a foot control power relay mechanism for controlling the movement of the shifter shown in Figs. 7, 10 and 15;

Fig. 10 is a view similar to Fig. 7 showing an alternative cam shifting mechanism;

Fig. 11 is a view showing a detail of the mechanism illustrated in Fig. 10;

Fig. 12 is a vertical longitudinal section of a fuel burner in the air line for adding heat to the compressed air;

Fig. 13 is a diagrammatic layout of a modified form of fuel system for the fuel burner in the air line;

Fig. 14 is a fragmentary plan view of a cam taken on line 14—14 of Fig. 13;

Fig. 15 is a diagrammatic side elevation, partially in section, showing the power plant;

Fig. 16 is a diagrammatic layout of the entire ignition system of the power plant;

Fig. 17 is a diagrammatic top plan view of the power plant shown in Fig. 15 illustrating several valve controlled passages; and, Fig. 18 is an enlarged section similar to Fig. 2 illustrating the valve gear set for regenerative braking.

Corresponding reference characters indicate corresponding parts throughout the several views of the drawings.

Referring now more particularly to Fig. 1, it will be seen that this apparatus comprises three principal elements, namely, an engine E, an air heater H and a compressed air or pressure tank PT. The engine E has the conventional parts, namely, cylinder, crank, connecting rod, piston and the like and a special form of valve gear and control to be described hereinafter.

The heater H may comprise any device adapted to raise the temperature of a gas under pressure, but the preferred form, where the expansive medium is air, is designed to burn a hydrocarbon fuel inside of the air line, the fuel thus combining with a portion of the compressed air and the products of combustion mixing with and adding to the volume of the expansive medium. This form of heater minimizes heat losses as well as the size of the apparatus.

The pressure tank PT must be adapted to withstand the pressures used and large enough to hold the quantity of air required to store the desired amount of potential energy.

The engine E with its valve system is shown diagrammatically in Fig. 1 and partially in Fig. 2. Fig. 15 illustrates a three cylinder engine embodying the elements of the invention.

In Fig. 1 the piston P driving the crank shaft C is on the lower dead center at the end of its expansion or power stroke. The intake port PI and the exhaust port PE are uncovered by the piston P and fresh air is blown into the cylinder by a suitable supercharger S, thereby scavaging the cylinder of the gases from the previous cycle in the manner customary with two-stroke cycle motors.

As the piston P ascends the displaced air is ejected through the valve VR and port PR. This ejecting valve VR is closed at a definite time by a cam action, after which the air remaining in the cylinder above the piston is compressed until its pressure exceeds that in the storage bank PT sufficiently to lift the spring operated automatic delivery valve VD in the manner common to air compressors, whence the compressed air is ejected from the cylinder into the storage tank through the delivery port PD.

At the end of the up stroke, when the piston is about to descend, the cut-off valve VP is opened by cam action and heated compressed air is admitted above the piston and forces it downward to provide the power stroke. This air comes from the air line and storage tank and just before it enters the cylinder it passes through the heater H where heat is added which expands the air under constant pressure. At the proper time, determined by the control means to be described, the valve VP is closed (cut-off). During the remainder of the power stroke expansion takes place in the cylinder until the exhaust port PE is uncovered, at which time the contents of the cylinder are exhausted down to back pressure (preferably atmospheric) and then scavenged by the next incoming charge of fresh air from the supercharger S.

In order that the positive work on the downward power stroke may exceed the negative work on the compression stroke, thus leaving a net difference to drive the engine and supply losses, the mean effective pressure on the power stroke must exceed that on the compression stroke. Under steady running condition the amount of air by weight in the storage tank PT is constant and hence the weight of air compressed must be equal to the weight of air used on the expansion strokes.

Due to the expansion which takes place under constant pressure while the air is passing through the heater H, the volume of air used on the power strokes is increased and thus, while the maximum pressures on the two strokes are the same, the mean effective pressure on the power stroke is the greater. For steady running conditions the heater H is adjusted to supply the amount of heat energy required and the compression and cut-off valves VR and VP are respectively adjusted so that the weight of air in the tank remains substantially constant. Since the air in making the circuit from the port PD through the heater and back through the port PP traverses a short path which can be readily insulated, the heat of compression is conserved and the principal heat losses are therefore confined to the cylinder jacket losses and the exhaust.

The stored energy in the compressed air tank can be drawn upon to start the engine or to increase the power output under peak loads. To do this, the time of compression is shortened or reduced to zero and the timing of the cut-off is lengthened, up to a maximum of the full stroke less the fraction of the stroke taken up by the lower ports PE and PI. In this way, a greater weight of air is expanded than is compressed, the excess coming from the storage tank.

In the case of a negative load, when the engine is being driven by external power, the valve timing may be set so that air is compressed on the upward stroke and no air is expanded on the power stroke. The engine thus operates as an externally driven air compressor and as such may be used as a regenerative brake. Such an application is found in the deceleration or down-hill coasting of a vehicle. In such an instance, the heater H is not used and the cut-off is set for zero, that is, at the beginning of the power stroke, so that there is no admission of compressed air. The amount of negative work may then be increased by advancing the time of the beginning of compression up to full stroke. The maximum braking effort is limited by the volume of the cylinder, above the lower ports, and by the delivery pressure. The latter can be increased up to any safe value by the use of a throttle valve 1 in the line leading to the storage tank. Operation as a brake can be continued indefinitely by the use of a safety valve 3 on the storage tank line to relieve the excess air after a predetermined maximum pressure has been reached. Settings for braking conditions are illustrated in Fig. 18.

The engine can also act as a self-driven air compressor. In this case the heater is controlled to supply the necessary amount of energy to every unit volume of compressed air admitted to the cylinder and the relative timing of the compression and cut-off valve is adjusted so that a greater weight of air is compressed on the compression stroke than is consumed on the power stroke, the work done on the latter stroke being just sufficient to compress the air and overcome friction. The air thus accumulated in the storage tank may be conserved for subsequent starting or peak loads or it may be drawn off and used for any of the purposes for which compressed air is useful.

Simultaneous operation as an air compressor and a motor is effected by suitable control of the energy imparted to the medium in the heater H and adjustment of the compression and cut-off events so that the amount of air compressed is in excess of the amount used to drive the engine together with its connected load. This makes it possible to charge the air storage tank while the external mechanical load is relatively light.

It is evident that the speed of the engine is not a factor in any of the above described operations as far as the pull or torque is concerned, because the torque depends on the net mean effective pressure which has no inherent relation to the speed.

This type of power plant is particularly adapted to such a load as vehicle traction. The resistance of this load is the sum of factors depending upon weight carried and road surface, upon the wind resistance and upon grade. These components may add in such way at different times that every possible value of the resistance may be encountered at each and every speed and at standstill. This resistance in general increases with the speed. When power is applied to drive the load the reaction of the load is always exactly equal and opposite to the torque of the engine and if the resistance torque is less than the engine torque the difference is expended in accelerating until the resistance, at the higher speed, has reached a value which just balances the pull of the engine when the speed becomes constant at a new value.

While the pull of the engine determines the speed, under different conditions the same speed may require widely different degrees of pull, and to meet these requirements the power plant must have flexibility, that is, it must be able to develop any required pull at every speed. Certain types of power plant, notably the series electric motor, used principally for traction, and the automotive internal combustion engine have an inherent relationship between speed and torque and hence are not ideally adapted for tractive purposes. The former is in general limited to but one torque value for every speed, unless wasteful resistance is used to vary the applied voltage at the motor. The latter engine has a very limited torque range, the maximum of which does not vary greatly, within certain limits of speed, so that it is necessary to interpose speed changing means between the motor and the load in order that the load speed may be varied without a great change in the engine speed. The steam engine and the engine of this invention have the desirable property that there is no inherent relation between the torque which the engine is producing and its speed but the pull of the engine can be controlled directly to match the reaction of the load, whatever the speed. The ratio between the maximum pull of which the engine of this invention is capable and its pull at normal rated load (load of maximum efficiency) is even greater than the usual gear ratio in automotive practice so that this engine may be coupled directly to a vehicle propeller shaft without the use of reducing or change gearing which is a serious difficulty when considerable amounts of power are involved.

Inasmuch as this engine is single acting, at least three cylinders are desirable to avoid dead centers (Fig. 15). However, as there is an impulse for each revolution of each crank the three cylinder engine is equivalent to a six cylinder four-stroke-cycle engine as far as continuity of torque is concerned. In this invention there is no object in having any two or more of the crank throws in phase, hence they should divide the crank circle in equal parts. A flywheel 5 is used with enough momentum to smooth out the fluctuations in speed caused by the discontinuous nature of the forces on both strokes of the piston (see Fig. 15).

This engine operates on what is known as the constant pressure cycle. The compression and the expansion are nearly adiabatic and the heating and cooling take place at constant pressure. The equivalent of the cooling part of the cycle occurs when the warm exhaust is rejected to the atmosphere and a fresh charge at atmospheric pressure and temperature is taken in and compressed.

The thermodynamic efficiency (which is the ideal or maximum efficiency of any heat cycle) is much higher in this system than in the usual internal combustion or the steam engine. In this, the constant pressure cycle, the ideal efficiency is the same as in the Carnot and the constant volume cycle. The ideal thermal efficiency is a function of the pressure ratio only and is a maximum when the expansion is carried down to back pressure.

The engine E may be considered as an air compressor and air motor combined in the same cylinder. Adding heat to compressed air entering an air motor is one of the most efficient methods known for converting heat into mechanical energy.

The horsepower capacity of the engine per unit volume of displacement is, under steady running conditions, a function of the pressure and the temperature of the heated air.

A considerable variation is permissible in the selection of pressures and temperatures, the proper choice depending upon the particular materials employed and details of design. For example, the pressure of the compressed air may be between 190 and 250 pounds gage and the temperature of the air leaving the heater between 1300° F. and 1700° F.

The use of steam in this cycle may be advantageous under certain conditions, particularly when waste heat is used for making the steam.

This can be done by placing the water in the jackets under pressure of the air line, boiling the water by heat ordinarily wasted in the exhaust and through the cylinder walls and allowing the steam to escape into the air line ahead of the heater. This steam is then superheated in the heater along with the air with which it expands in the cylinder doing work. Fig. 3 shows the connections for this economizing system.

The water storage tank is represented by indicia WT. This storage tank WT is placed under pressure of the air line 7 leading from the pressure tank PT (see also Fig. 15). This tank WT communicates with the jacket 9 surrounding the cylinder. This is done by way of a coil 11, enclosed in a casing 13, and by lines 12 and 14. The exhaust gases from the engine pass through the casing 13, giving up a considerable part of their waste heat to the water in the coil 11, which warms the water entering the cylinder jacket space. The exhaust gases enter by way of a line 15 and leave by a line 17, the line 15 being connected to the exhaust port PE. The jacket water is permitted to boil in absorbing the heat transmitted through the cylinder walls and the steam passes off through a pipe 21 into the air line 7 ahead of the heater H. The point at which the steam enters the air line ahead of the heater H is indicated by the numeral 23.

It is to be noted that the pipes 11, 12 and 14 with the engine jacket comprise a ring circulating means. The temperature in coil 11 is lower than that in the jacket, so that the circulation is affected in a counter-clockwise direction. Under certain heating conditions a reverse circulation can be had.

As illustrated in Fig. 3, the water level in the storage tank WT is substantially at the same level as that in the jacket space.

Referring now more particularly to Fig. 2 there is illustrated in diagrammatic form the valve gear which governs the opening and closing of the mechanically operated valves VR and VP. The cam shafts CC, CM and CA are driven by suitable gearing 25 from the crank shaft C at crank shaft speed (see also Figs. 7, 10 and 15). This gearing is provided with means, to be described, for altering at will the angular relation between these cams and between them as a whole and the crank shaft C. This can be done while the engine is running or at a standstill. The valve VR opens downward into the cylinder and is provided with a rocking cross bar 27 on the upper end of the valve stem 29. This bar 27 is acted upon by both cams 31, 33 on the cam shafts CC and CM respectively and the positioning is such that the valve VR is opened only when both cams act together on the cross bar 27 and is closed when either or both of the cams are in non-cooperative position. Each of these cams subtends an angle of 180° and hence when they are in phase the valve is opened during one-half revolution of the crank. Cam 31 always leads cam 33 more or less and hence the valve is opened by the leading face of 33 and closed by the trailing face of 31. Cam 33 always is in the position to open the valve VR when the crank is on lower center (Fig. 1) but the closing of the valve VR and beginning of compression is controlled by the angular position of 31 in respect to 33 and the crank. Advancing the position of 31 advances the time of beginning of compression until when 31 is opposite 33 the valve is closed throughout the up stroke and the compression is a maximum. It should again be noted that the action of neither cam 31 nor 33 will alone effect an opening of the valve VR and when they are 180° apart the cams 31 and 33 never act together on the rocker bar 27. Hence, as described VR is never opened. This is a type of valve gear where the opening and closing events are separately controlled and can be set as near together or as far apart as desired.

The admission valve VP is also provided with a rocker cross-bar 37 attached to valve stem 39 but as this valve VP opens outwardly from the cylinder against the pressure of the air line PP, the cams 33 and 35 are made to operate on the under side of the bar 37 to lift it. The positioning is such that the valve is opened when acted upon by both cams 33 and 35 together and is closed when either or both of them are inactive on the bar. Cam 35 is always more or less in advance of cam 33 so that the valve is opened by the leading face of cam 33 and closed by the trailing face of the cam 35. Cam 35 may therefore be called the cut-off cam as it determines the time of cut-off of admission. Cam 33 always is in position to open the valve when the crank is on upper center. The shifting mechanism for 35 is arranged to limit the maximum period of admission (cut-off) to the time required for the piston to travel from upper center to the top of the lower ports in the cylinder. This gearing has a property of the Corliss steam engine gear, wherein the time of cut-off may be independently regulated without affecting the timing of the other events of the cycle.

The direction of rotation of the crank shaft may be reversed by exchanging all the cams for reversed duplicate cams, that is, right hand for left hand and vice versa (see Figs. 4 and 5). Looking at the engine from the front end, if the crank shaft is revolving clockwise (Fig. 4) and the cams are called right hand cams (Fig. 4), then from the rear end view the crank shaft is revolving counter-clockwise and the same cams have a left hand aspect (Fig. 5). The front and rear end views of the crank and cams are mirror images or reversed duplicates of each other. When the direction of rotation of the crankshaft, together with the cam shafts, is reversed, if the engine is to function as a motor as before, the sequence of the valve timing must not be changed but the cams must be changed right hand for left hand and vice versa. This can be done as is the standard practice in reversing gas engines, or with a single set of cams the shafts may be rotated through an angle B (Fig. 6) which will bring the face of the cam in question which was initially trailing into leading position 180° from the initial leading position. When the cams subtend an angle of 180° the engine is reversed by rotating the cam shafts through 180°. It will be shown hereinafter the manner in which this reversal is accomplished.

When the valve gearing is reversed with the engine at rest it will start up in the new direction for which the valves are set. But if the valve gearing is reversed when the engine has momentum, it cannot reverse instantly but will continue to rotate in the direction against which the valves are set and the valve gearing will rotate backward with backward sequence until the momentum is overcome and the engine stops and reverses. During this time opposed power is generated. Assume, for example, that the valves are set for maximum admission and maximum compression and that the piston is on lower center about to rise on the compression stroke when the valve gearing is suddenly reversed. Then the piston on rising does not meet normal compression but the admission valve is soon open and compressed air rushes into the empty cylinder and opposes the rising motion of the piston. The piston pushes the air back into the air line doing negative work. On the following down stroke the valves are all closed, a vacuum is created above the piston and the piston in descending works against atmospheric pressure on its under side. This also represents negative work or opposed power. This power is wasted and not regenerated, since the air rushing into the cylinder at the end of the strokes incurs a loss of available energy due to throttling. Thermodynamically it is an irreversible adiabatic process analogous to friction loss in a pipe line. This method of reversing the engine or exerting opposed power can be used in emergency stopping but ordinarily regenerative braking is used instead to stop the engine after which the valve gearing is reversed.

The control of the valve gear, and by this means the control of the amount and the direction of power flow, as well as the direction of rotation of the crank shaft, is effected by cam shifting or adjusting mechanism as shown in Figs. 7 and 8. One such adjuster mechanism is mounted on the cam shaft CC for controlling the time of compression, another is mounted on the shaft CA for controlling the time of cut-off or period of admission. Another similar adjuster is mounted on the crank shaft C, from which all three cam shafts CC, CM and CA are driven by means of a chain 41 and sprockets 43 and 45 at crank shaft speed. This adjuster on the crank shaft C is used to shift the whole set through 180° in reversing the rotation.

In Figs. 7 and 8 the adjuster 47 controlling the compression cam shaft CC will be described by way of example. The driven gear 49 (or driving sprocket 43 in case of adjuster 55) is provided with a preferably single helically grooved hub 51 into which is screwed a correspondingly threaded sleeve 53. The sleeve 53 is slidably splined to the driven cam shaft CC (or in the case of adjuster 55 to crank shaft C). Relative longitudinal movement between the sleeve 51 and the driving or driven shaft (CC or C for example) causes a change in relative angular positions. Hence by providing a peripheral groove 57 and a cooperating shifter fork 59, movement of the fork on its pivot 61 will, by sliding the sleeve 51, change the angular relationship between the driver and driven while both are rotating or standing still. The thread is steep enough to permit the action, that is, at least 45 degrees helix angle. A fork 63 is provided for the shifter 65 of the cut-off cam shaft CA and a fork 67 for the crank shaft C shift or adjuster 55. It may be noted that the shifter 55 reacts on the crank shaft C to change the position of sprocket 43 and the complete valve gear mechanism, while the shifters 47 and 65 react against their respective gears 48 and 69 to change the positions of their respective cam shafts CC and CA independently. The shifts are for the purposes hereinbefore made clear.

The reverse shifter 55 is operated by a hand lever 71 which takes the place of the ordinary gear shift lever (see Fig. 15) when used to reverse.

The valve control shifters 47 and 65 are operated from a sensitive-control relay system (Fig. 9). Each arm 73 and 75 of the bell-crank forks 59 and 63 respectively is pivoted to a piston and rod combination 77 which reaches and pneumatically cooperates with an air cylinder 79. Air is led to each of the cylinders 79 by inlet lines 81, whereby pressure is exerted on one side of the respective pistons. A spring 83 reacting on each of the other sides of the pistons tends to hold them in a position whereby the cam shaft CA is set for zero admission and the compression cam shaft CC is timed for zero compression. Hence the engine does not move when no air pressure is applied to the control cylinders 79.

The air lines 81 lead to relay or control valves 85 and 87. Each valve comprises a bushed inlet 89 receiving air by way of line L from the main tank PT and through which a valve stem 91 passes. The stems 91 pass through the floor boards of the vehicle or control station and are there provided with pedals 93 and 95 pressed upwardly by springs 97. The upward action of the springs causes the two valve plugs 99 to be normally held upwardly to a bevelled seat 101, whereby no air can get from the inlets 89 of the valves to the lines 81 or exhaust lines 103. When the stems are depressed air passes from the inlets 89 to the lines 81 and also escapes through exhausts 103. In order to regulate the relative amounts of air passing to exhaust and to the lines 81 a valve seat 105 is formed at the exhausts. The lines 81 are connected in between the seats 101 and 105. As the plug 99 unseats from the upper seat 101, the lower seat 105 tends to, and after sufficient depression of the pedal 93, does close. The result is that by depressing either of the pedals 93 or 95, air may be made to flow to its respective cylinder 79 at desired rates and pressure. For instance, just at unseating at seat 101 a relatively great proportion of the air will flow to the exhaust, and only a small pressure will be built up in the body of the valves 85 or 87 and in cylinder 79, whereat its respective connected cam shaft shifter moves only slightly. If the pedal 93 is maintained in the said position, the pressure in the cylinder 79 will remain constant. Hence, the cam shaft setting will remain constant. Proportionately increased pressures may be applied to either of said cylinders by proportionally depressing the respective valve stems. The exhaust 103, by this means, is increasingly throttled until finally it may be closed entirely, whereat the full pressure of the inlet line L is had in the cylinders 79. They are designed to then have their respective shifters thrown to the limit at this juncture. When the pedal 93 or 95 is released, inlet pressure from line L is cut-off while the exhaust opens. The cylinders 79 therefor exhaust to atmosphere and either or both of the shifters 47, 65 are returned to normal position under action of one of the springs 83. From the above it is evident that the cam shafts may readily be adjusted to a given position by depressing the pedals 93 and 95.

When the pedal 93 is depressed, the shifter 65 on the cam shaft CA is moved to retard the cut-off event, that is, to increase the period of admission and thus increase the power output of the engine. Likewise when the pedal 95 is depressed the shifter 47 is moved to advance the time of beginning of compression and thus increase the amount of air compressed. Under normal running conditions when the weight of air compressed is equal to the weight of air used on the expansion strokes a certain proportionality must exist between the time of beginning of compression and the time of admission (cut-off). Thus, for example, if with full stroke compression the same weight of air is expanded when the cut-off is set at 20% of stroke this will represent maximum continuous load without drawing upon the storage tank and any load less than that maximum will require an adjustment of the compression event less than full stroke according to some definite function of the time of admission cut-off. In order to vary these two events simultaneously and in the right proportions the pedal 107 is provided with a member 109 coacting between the cam shaped bell crank levers 111 and 113. The shape of these cam surfaces is so formed that by depressing the pedal 107, these levers bear upon the stops 92 of stems 91 causing them to move downwardly and in the proper ratio. Thus for normal running the pedal 107 only is used to vary the torque of the engine.

In starting under load it may be desirable to exert maximum torque and for this purpose the compression is made zero and the admission cut-off period increased as needed. In this case only the pedal 93 is depressed and the control valve 85 remains closed.

When regenerative braking is desired only the pedal 95 is depressed and control valve 87 remains closed, so that no air is admitted to the engine cylinder on the expansion strokes and the amount of compression is increased as desired up to the maximum. Additional braking effort is obtainable by partially closing the throttle valve 1 (Fig. 15)

in the delivery line to increase the back pressure.

Due to different conditions of stopping and starting, it may happen that more air is used from the tank in accelerating than is recovered in the regenerating operations and hence the amount of air stored in the tank tends to become depleted. In order to compensate for this without attention on the part of the operator a pneumatic control cylinder 115 with piston 117 and wedge shaped piston rod member 119 is provided. This wedge member 119 operates between the stop 92 on the stem 91 of pedal 95 and the finger of the lever 113. It is pushed into increasing engagement by a spring 121 in the cylinder and out of engagement by air pressure from the tank. When the engine E is operated under normal conditions from the pedal 107, if the pressure in the tank is below normal the wedge is inserted more or less between the stop on the control valve stem and the finger of 113, so that the proportional movement of the compression timing control is increased and a greater than normal amount of air is compressed. As the air in the tank approaches normal the wedge is withdrawn and the normal ratio of timing restored.

As soon as the pedal 93 is depressed and air admitted to the engine cylinder to start the engine, the lever 75 closes the ignition contact 123 (see also Fig. 16) which ignites the fuel in the heater H and at the same time the wire or rod 125 is moved, which controls the amount of fuel supplied to the heater as hereinafter described.

The forks 59 and 63 and the levers 111 and 113 are properly mounted on pivot members of the side walls of the engine or vehicle.

All of the power control is effected by the foot pedals while reversing is manually controlled by handle 71 (Fig. 15).

The relative positioning of the lower sprocket 43 with regard to the crank shaft C may be shifted in another manner (Figs. 10 and 11). In a like modified manner may the relative positions of the cut-off cam shaft CA and the compression cam shaft CC be shifted. This modified type of adjuster will be described in its application to shifting the lower sprocket 43 and its attendant valve gear.

The device (Fig. 11) comprises a bevel gear 127 keyed to the crank shaft C acting as a driver. The shaft C passes through a bearing 129 of an epicyclic arm 131. The arm 131 rotatably carries a planetory bevel gear 135 which meshes with the said driving bevel gear 127 and is driven thereby. The gear 135 transmits rotary motion to a driven bevel gear 137 integral with sprocket 43 and rotatably borne on the shaft C. The direction of motion of gear 137 is reversed from that of the shaft C. Hence, for operation of an engine as hereinbefore described, similar rotation reversing devices should be interposed between the gears 48, 49 and 69, at the three cam shafts CC, CM and CA, and said cam shafts. Such devices are indicated at numerals 141, 139 and 143 at the respective shafts CC, CM and CA (Fig. 10). The use of these devices makes the movement of the various cam shafts the same as it was in the case of Figs. 7 and 8.

Referring again to Fig. 11 it is evident that if the arm 131 be rotated, that beside the driving effect which the gear 137 receives from gear 127 by way of gear 135, that said gear 137 will also be moved an additional amount due to the rolling action of the planetary gear 135 on its sun gear 127. This effect, if the motion be reversed, may amount to a loss in movement instead of a gain, as described. It is evident that the gear 137, together with sprocket 43, may then have its angular relationship with gear 127 and shaft C, changed as the arm 131 moves. After such change in relationship (when movement of the arm 131 is stopped) then the gear 137 has a new angular position with regard to gear 127. The repositioning may be made to amount to 180° if desired for reversal in the case of the sprocket 43. The angular shift is double the angular motion of the arm 131.

Fig. 11 shows that the gear 137 carries with it a hub or sleeve 145 upon which is integrally formed said lower sprocket 43. The chain 41 is thus driven from the crank shaft. The arm 131 is adapted to be operated from the reversing lever 71 for reversing rotation.

Epicyclic adjuster mechanisms such as the above comprise the shifting mechanisms 141 and 143 of the compression CC and cut-off cam shaft CA. These mechanisms 141 and 143 serve to reverse and serve to shift the movement transmitted from the hubs 147 and 149 to the cam shafts. The hubs are turning in the reversed direction, due to reverse movement of the lower and upper sprockets 43 and 45.

The epicyclic mechanisms 141 and 143 are identical to the one shown in Fig. 11. In them, however, the gear corresponding to gear 137 (Fig. 11) receives motion from the gears 49 by way of the integral hubs 147 and 149 which are substitutes for the hub 145 of Fig. 11. This motion is transmitted to the driven cam shafts CC and CA and reversed in transmission through the epicyclic trains. The two described reversals cause rotation of said cams shafts in the direction shown in Figs. 7 and 8.

The mechanisms 141 and 143, not only act to reverse the movement as described but if their epicyclic arms 151 and 153 are rotated, then adjustment of the cam shafts may be had with respect to the gears 48 and 69. This is as desired and accomplishes the hereinbefore described results.

Adjustment of the devices 141 and 143 may be had from air cylinders 155 and 157 corresponding to the cylinders 79 used in the previous form. The operation for adjusting is evident in view of Figs. 9 and 10.

The reversing mechanism 139 for the cam shaft CM is not truly epicyclic, in that its arm 159, although rotatable is not movable. It is held in a stationary bearing 161. It serves only to reverse the already reverse movement of the upper gear 49 so that the cam shaft CM moves in the desired direction in respect to the other two cam shafts. The upper sprocket 45 and its gear 49 are made fast to a common hub 163, which also carries fast thereto a bevel gear similar to the gear 137 of Fig. 11. The hub 163 rotates on the cam shaft CM and transmits reverse movement thereto by way of the mechanism 139, which is exactly analogous to the mechanism of Fig. 11, except that its arm 159 is not, adjustable.

The burner or heater H of Fig. 1 which serves the purpose of efficiently adding heat to the compressed air comprises a cylinder 165 (Fig. 12). This cylinder 165 is built to withstand the maximum pressures of the system and is provided with a heat resisting lining 167 and Venturi tube 169 of similar material, preferably a heat resisting nickel-chromium alloy. Passages 171 are formed around the tube 169. Projecting centrally into the Venturi tube 169 (from beneath) is a fuel nozzle and feed line 173 and 217 respectively for hydro-carbon fuel. Some of the air passes up near the lined walls of cylinder 165 by way of said ports 171. This portion of the air tends to cool the lining of the burner while the remainder serves to support combustion.

A spark plug 175 grounded on the lining 167 has its electrode extending out to form a gap with said Venturi tube 169. A proper conventional ignition system 177 (Figs. 9 and 16) is provided for sparking the plug when air is passing through the heater H. To close the ignition circuit when air is rushing through the heater to the engine, a switch 123 is provided. This switch is operable to close immediately upon depression of the accelerator pedal 93 (see Fig. 9). Hence as admission cut-off in the engine is increased from zero, then immediately the switch 123 is closed. Compressed air then passes through the burner H and thence into the engine. The closed switch 123 causes the plug 175 to ignite the charge of air and atomized fuel passing through the Venturi tube 169. The flame indicated in dotted lines in Fig. 12 is thus engendered and the air is efficiently heated. A jacket of relatively cooler air passes around the flame and holds the temperature of the lining 167 within practical limits.

The outlet line or manifold PP from the heater H leads to the mechanically operated inlet valves VP of the engine.

The system for feeding fuel to the burner H is shown in Figs. 13 and 14. The tank FT contains the supply of hydro-carbon fuel. A conventional plunger pump 179 driven by a sprocket 181 from the chain 41 serves to draw fuel from the bottom of tank FT by way of line 185. This it obviously does at a rate which is proportional to the speed of the engine (see also Fig. 15).

The pump 179 forces this fuel past a check valve 187 and into a line 189 by way of an air equalizer chamber 191. The equalizer 191 serves to produce more or less continuous flow in the line 189, that is, it smooths out or equalizes the pressure fluctuations of the reciprocating pump 179.

The line 189 from the equalizer leads to a by-pass valve 193. This valve 193 comprises three chambers 195, 197 and 199. The line 189 leads to the central chamber 197.

Valve seats 201 and 203 and a seating plug 205 therefore serve to connect the chamber 197 with the chambers 195 and 199. The aera of the passage at each seat is proportional to the vertical positioning of the plug 205. This plug 205 is normally operable to seat at the lower seat 201 under the turning action of a threaded stem 207. The stem 207 is threaded through a gland 209 of the chamber 195 and is normally turned clockwise (Fig. 14) to seat the plug 205 downwardly by the action of a coil spring 211 acting in a clockwise direction on a cam 213 fastened to said stem 207. Counter-clockwise movement of the cam 213 is accomplished by a wire 125 or the like wrapped on its edge and passing to said shifter lever 75 of Figs. 9, 16. The wire 125 is operable to be drawn progressively in the direction indicated by arrow in Fig. 14 when the pedal 93 is set to positions of increasing cut-off. Any simple connections with said lever as shown suffices to accomplish the purpose. The one shown comprises the properly borne rod 125 (Fig. 9) adapted to be moved vertically when the pedal 93, is depressed.

Movement of the wire 125 and cam 213, as indicated in Fig. 14, causes the plug 205 to be raised and finally to seat at the upper seat 203. The rate of opening and closing of the seats 201 and 203 respectively, comprises an inverse function and either opening or closing is a function of the movement of pedal 93 to cut-off positions.

The chamber 195 is connected with the upper part of tank FT by a line 215, while the lower chamber 199 is connected with the fuel feeding tip 173 of the venturi 169 by way of line 217. The venturi 169 is in the burner H as before described. An air equalizing pressure line 219 leads from the burner H to the top of tank FT.

The operation is as follows:

When the foot pedal 93 is set at zero cut-off no compressed air is admitted to the engine E. The wire 125 permits, and the spring 211 causes the plug 205 to close at seat 201 and the pump 179 merely pumps fuel from line 185; through line 189, chamber 197, seat 203, chamber 195, line 215; and back to the fuel tank FT. The pump runs at speeds proportional to engine speeds. If the engine runs backwards, then so does the pump 179, but the pump always pumps fuel when it does run. If the engine is at a standstill, then no fuel is needed and the pump does not move. The equalizing connection 219 places the tank under pressure and relieves the pump of a head to work against other than the head due to fluid friction and throttling.

If the pedal 93 is set to some finite cut-off position, the compressed air is admitted to the engine E, whether it be running forward or in reverse. Fuel is required to heat the air at a rate proportional to the weight of compressed air used which weight is proportional to engine speed and to some function of the period of admission.

It is evident from Fig. 13 that the engine speed varies the speed of the pump 179, and hence the amount of fuel pumped into the middle chamber 197 is proportional to said speed.

Since the pedal 93 indirectly controls the rise of plug 205 as cut-off is increased, then the flow of fuel from the chamber 197 will be under control of said pedal 93, that is, when the plug 205 rises at increased cut-off, by-passage of fuel back to the tank FT is decreased and passage to the nozzle 173 is increased. Hence the relative amount of fuel passing through the seat 201 with regard to seat 203 is regulated with the cut-off and is independent of speed. When, however, the speed changes, then the total amount of fuel flowing from the pump is changed and hence the amount fed to line 217 and line 215 is changed proportionally.

The shape of the cam 213 is fixed by experiment or otherwise to give the proper functional relationship between cut-off and fuel required. By the above means, the amount of fuel delivered at the venturi 169 is governed both by speed requirements and admission requirements of the engine E being proportional to the weight of air passing through the heater. At zero cut-off or zero speed or both no fuel flows to the burner H. With reverse rotation, the operation is as above described for forward operation.

In order to illustrate the operation of the apparatus in all its phases, a complete cycle of operations of the engine as applied to a vehicle drive will be described.

In starting it is assumed that the storage tank PT is charged with compressed air from any suitable source. If desired, a small motor driven air compressor of conventional design not shown may be supplied as auxiliary equipment to charge the tank initially.

The foot pedal 93 is depressed to admit compressed air from the tank into one of the cylinders. If the engine has three cylinders and one of the pistons happens to be almost but not yet quite at upper center no air pressure will be admitted to that cylinder, because the admission valve cannot open until after center is passed. In this case the cut-off must be set not less than 120° (about 75% of stroke) in order to admit pressure to the next piston which has passed center. As the crank begins to turn, pressure is admitted to the other cylinders in turn and the vehicle is accelerated. At this same time the ignition is started and the heater put in operation, which greatly increases the available energy content of the compressed air. The pedal is then manipulated to give any acceleration desired, although when the cut-off is set for more than 60 or 70% of stroke, there is very little power to be gained and the consumption of air continues proportional to the length of cut-off. During the time of acceleration under control of pedal 93 the compression is zero and thus the tractive effort is multiplied far above normal, not only because the full air pressure is available throughout the stroke, but also because there is no negative work of compression.

After the desired speed is reached, pedal 93 is released and 107 immediately depressed to maintain the speed at the desired value. This action sets the compression timing so that the same weight of air is compressed as is used expansively. The fuel supply to the heater is automatically regulated so that the heat energy added is proportional to the weight of air flowing through the heater and thus the temperature of the compressed air entering the engine remains substantially constant.

Some air has been taken from the storage tank in accelerating and if the pressure in the tank has been reduced below a predetermined point, the automatic control device 115 (Fig. 9) acts to increase above normal the proportion of air compressed and the excess is accumulated in the tank until the pressure builds up to normal.

When climbing a steep hill it may be necessary to utilize the overload capacity momentarily, in which case, the pedal 107 is released and the stored power in the tank drawn upon by using the pedal 93 as in starting.

When running on a smooth road on a slight down grade it may be that gravity will supply the exact amount of force needed to propel the vehicle and the engine will turn over without doing any external work positive or negative. If under these conditions, with the pressure in the tank PT below normal minimum, and the pedal 107 depressed slightly, then, through the action of the compensator 115, the power of the engine is entirely consumed in compressing air for storage. The plant thus constitutes a self-driven air compressor, since the external work is zero.

When coasting down a steep hill, continuous braking is required and the pedal 107 is released and 95 depressed. This causes the engine to function, as an externally driven air compressor. The ignition is cut off at 123 (Fig. 9) and fuel to the heater is stopped by member 125 (Figs. 9 and 14). This type of action may continue until normal maximum pressure is reached in the tank after which the air subsequently compressed must be relieved through the safety valve 3 (Figs. 1 and 15). Deceleration is obviously accomplished in the same manner as downhill coasting. Backing is accomplished by reversing the engine which runs exactly the same in either direction.

Thus in the operation of a vehicle by means of this invention, there is had an engine converting heat into mechanical power delivered to a drive shaft; air is compressed by the engine, which may be either a driving or a driven unit; a regenerative braking means; an engine direct-connected to the load, self-starting and reversible under load with control means for exerting the full range of torque as desired at any speed and an engine operating with high thermal efficiency and relatively great power output per unit of displacement.

Figs. 15 and 17 illustrate an embodiment of this invention as applied to an automotive power plant. Three cylinders 221, 223 and 225 are shown. The valves are housed in the head 227. The supercharger S (not shown) is driven from a gear on the flywheel end of the engine and is connected to the lower inlet ports on the near side of the engine (not shown in this view). The propellor shaft C is directly connected to the load. The throttle lever, reached from the control station, operates the throttle 1 which is intended chiefly for excess braking power although it can be used to regulate the flow of power taken from the storage tank. This form of regulation is not as desirable as a method of varying the time of cut-off, because power is lost in throttling. The crank throws of this engine are spaced 120° apart. The exhaust ports near the bottom of the cylinders are connected to the casing constituting the economizer 13 of Figs. 3 and 15.

Fig. 1, for illustrative diagrammatic purposes shows a simplified fuel system in which the fuel tank FT is in the pressure system, its level being maintained constant at the level of the nozzle 173 by conventional means. The fuel tank is in connection with another tank (not shown). The aspirating action of the air in passing through the heater H draws the fuel up to be ignited as a jet.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. The valve gear for an engine of the class described comprising an ejecting valve and a cut-off valve, cross bars associated with said valves, a pair of cams, one each for one end of each cross bar and a third cam operable on each of the other ends of said cross bars, each cross bar being resiliently pressed against one or both of respective cams.

2. The valve gear for an engine of the class described comprising an ejecting valve and a cut-off valve, cross bars associated with said valves, a pair of cams, one each for one end of each cross bar and a third cam operable on each of the other ends of said cross bars, each cross bar being resiliently pressed against one or both of respective cams and means for changing the relative angular positions of said cams.

3. The valve gear for an engine of the class described comprising an ejecting valve and a cut-off valve, cross bars associated with said valves, a pair of cams, one each for one end of each cross bar and a third cam operable on each of the other ends of said cross bars, each cross bar being resiliently pressed against one or both of respective cams and means for changing the relative positions of said cams with respect to each other and with respect to the cyclic operation of the engine with which they are associated.

4. A two-stroke cycle power system comprising a cylinder, a crank shaft, a connecting rod, a reciprocating piston in said cylinder adapted by means of said connecting rod to deliver and receive energy to and from said crank shaft, a pressure tank control means cooperating with the reciprocation of said piston whereby movement of said piston in one direction absorbs energy from said crank shaft and effects compression of a fluid and movement of said piston in a reverse direction delivers energy to said crank shaft and absorbs energy from the expansion of a fluid, means for passing said compressed fluid to said tank at the compressing operation and for re-delivering it from the tank to the cylinder at a subsequent expanding operation, means for increasing the heat content of said fluid between said compressing and expanding operations, means for variably controlling the periods of expansion and compression and means for reversing the direction of crank shaft movement under a given power condition.

5. A power system comprising a cylinder, a crank shaft, a reciprocating piston in said cylinder, a connecting rod between said cylinder and crank shaft, a pressure tank, means for compressing fluid into the tank upon one stroke, means for delivering said fluid from said tank to the cylinder for re-expansion upon another stroke, means for heating said fluid prior to re-expansion, a delivery valve in the line from the cylinder, a controllable cut-off valve in the line to the cylinder, and an ejecting valve adapted to close at a predetermined period, thus controlling the amount of fluid compressed and delivered to the tank.

6. The power system comprising a cylinder, a crank shaft, a connecting rod, a reciprocating piston in said cylinder operating upon a fluid, a pressure tank, means for delivering said fluid to the tank upon compression and to re-deliver said fluid to said cylinder for expansion, said means including an ejecting valve, a delivery valve and a cut-off valve in said cylinder and control means for said valves adapted to control the relative amounts of fluid compressed and expanded.

7. The power system comprising a cylinder, a crank shaft, a connecting rod, a reciprocating piston in said cylinder operating upon a fluid, a pressure tank, means for delivering said fluid to the tank upon compression and to re-deliver said fluid to said cylinder for expansion, said means comprising an ejecting valve and a cut-off valve, cross bars associated with said valve, a pair of cams, one each for one end of each cross bar and a third cam operable on each of the other ends of said cross bars, each cross bar being resiliently pressed against one or both of respective cams.

8. The power system comprising a cylinder, a crank shaft, a connecting rod, a reciprocating piston in said cylinder operating upon a fluid, a pressure tank, means for delivering said fluid to the tank upon compression and to re-deliver said fluid to said cylinder for expansion, said means including an ejecting valve, a delivery valve, a cut-off valve in said cylinder adapted to control the relative amounts of fluid compressed and expanded and manually controllable means for changing the relative timing of said valves whereby the system may be made to provide a net absorption of energy or a delivery thereof.

9. The power system comprising a cylinder, a crank shaft, a connecting rod, a reciprocating piston in said cylinder operating upon a fluid, a pressure tank, means for delivering said fluid to the tank upon compression and to re-deliver said fluid to said cylinder for expansion, said means including an ejecting valve, an automatic delivery valve, a cut-off valve in said cylinder adapted to control the relative amounts of fluid compressed and expanded and manually controllable means for changing the relative timing of said valves whereby the system may be made to provide a net absorption of energy or a delivery thereof in a forward or reverse direction.

In testimony whereof, I have signed my name to this specification this 2nd day of August, 1927.

HARVEY S. PARDEE.